3,500,804
FREE PISTON ENGINE
Anton Braun, 6421 Warren Ave.,
Minneapolis, Minn. 55435
Continuation-in-part of application Ser. No. 657,625,
Aug. 1, 1967. This application Dec. 16, 1968, Ser. No.
787,299
Int. Cl. F02d *39/10;* F02b *71/06*
U.S. Cl. 123—46                                 20 Claims

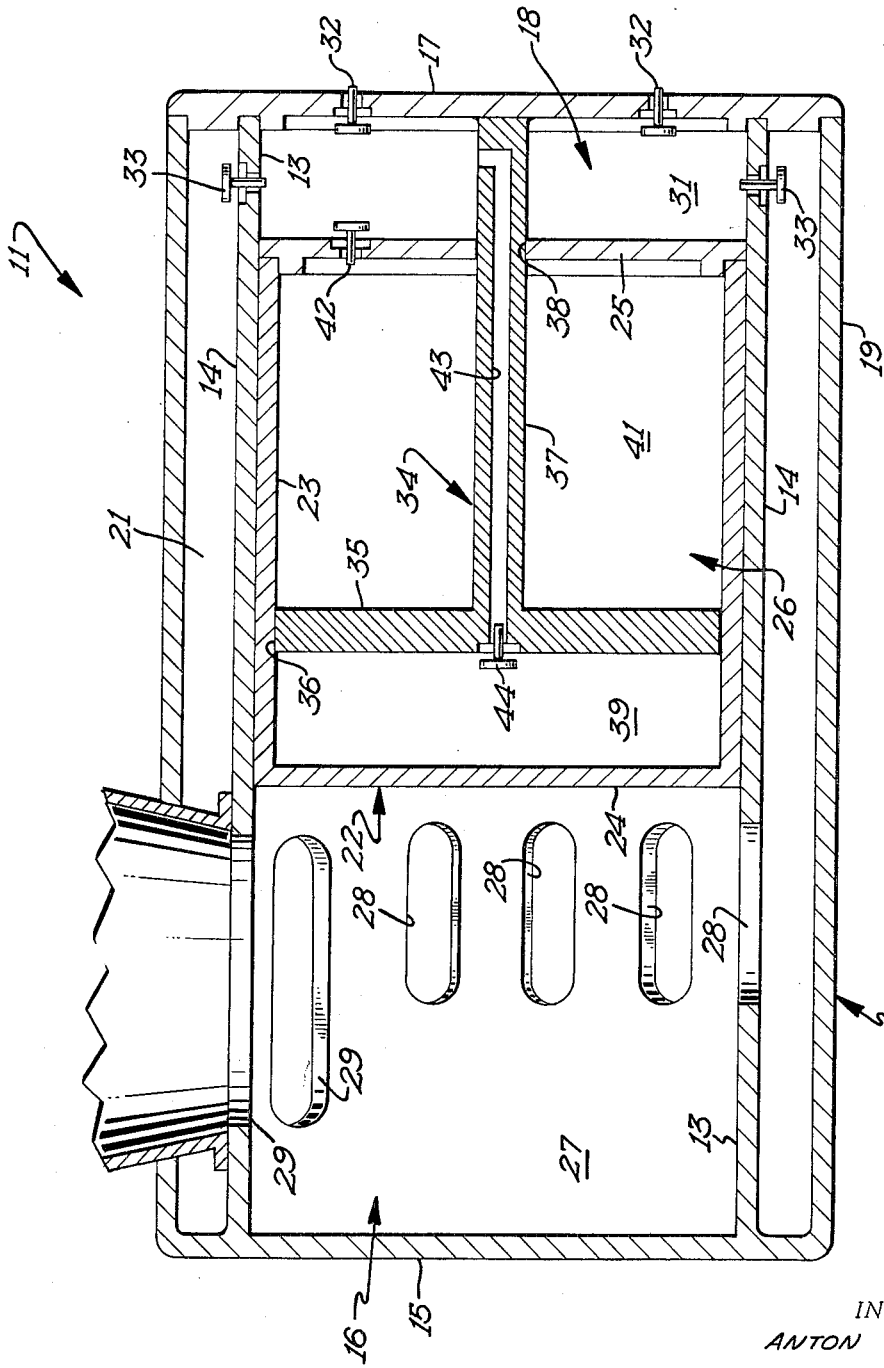

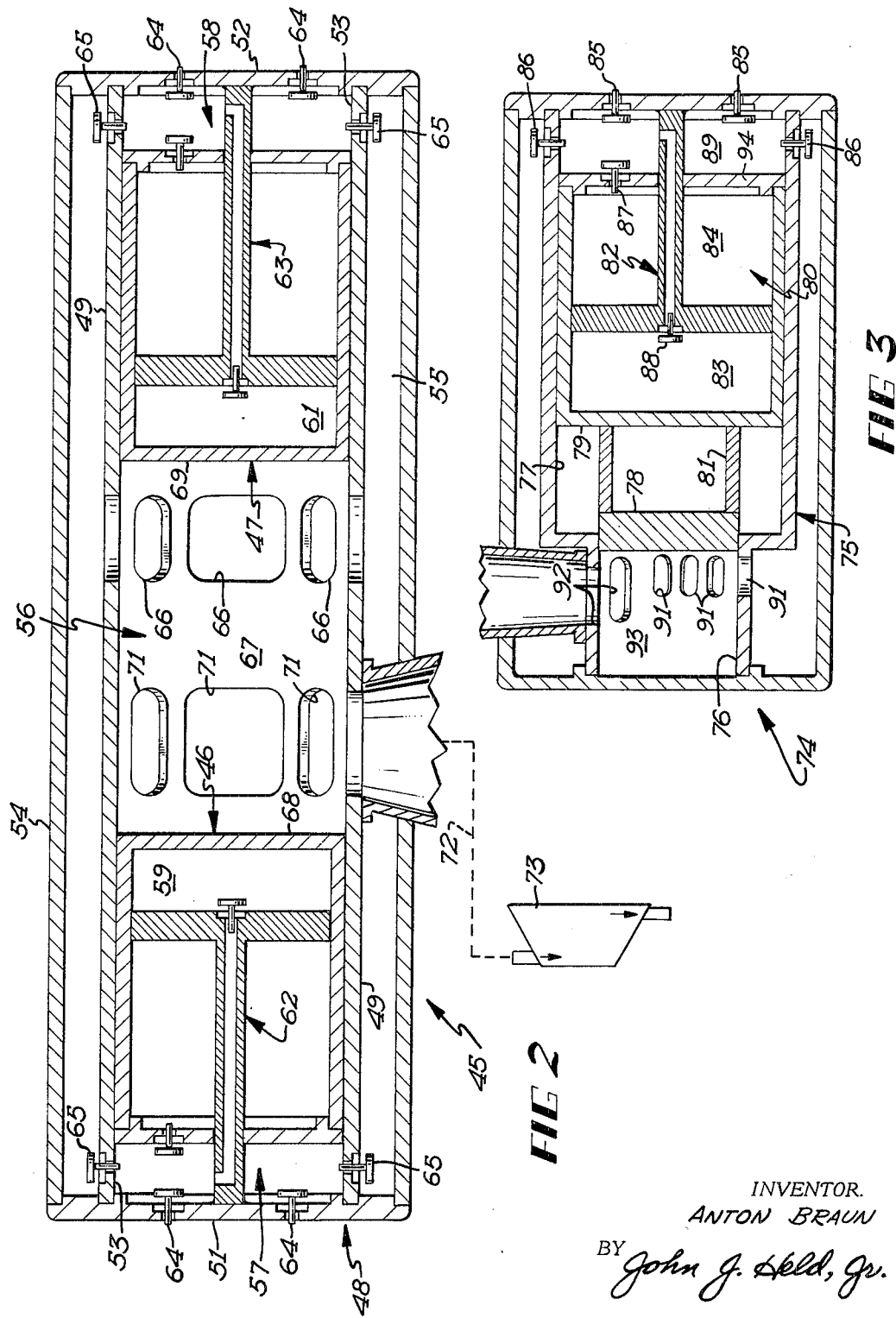

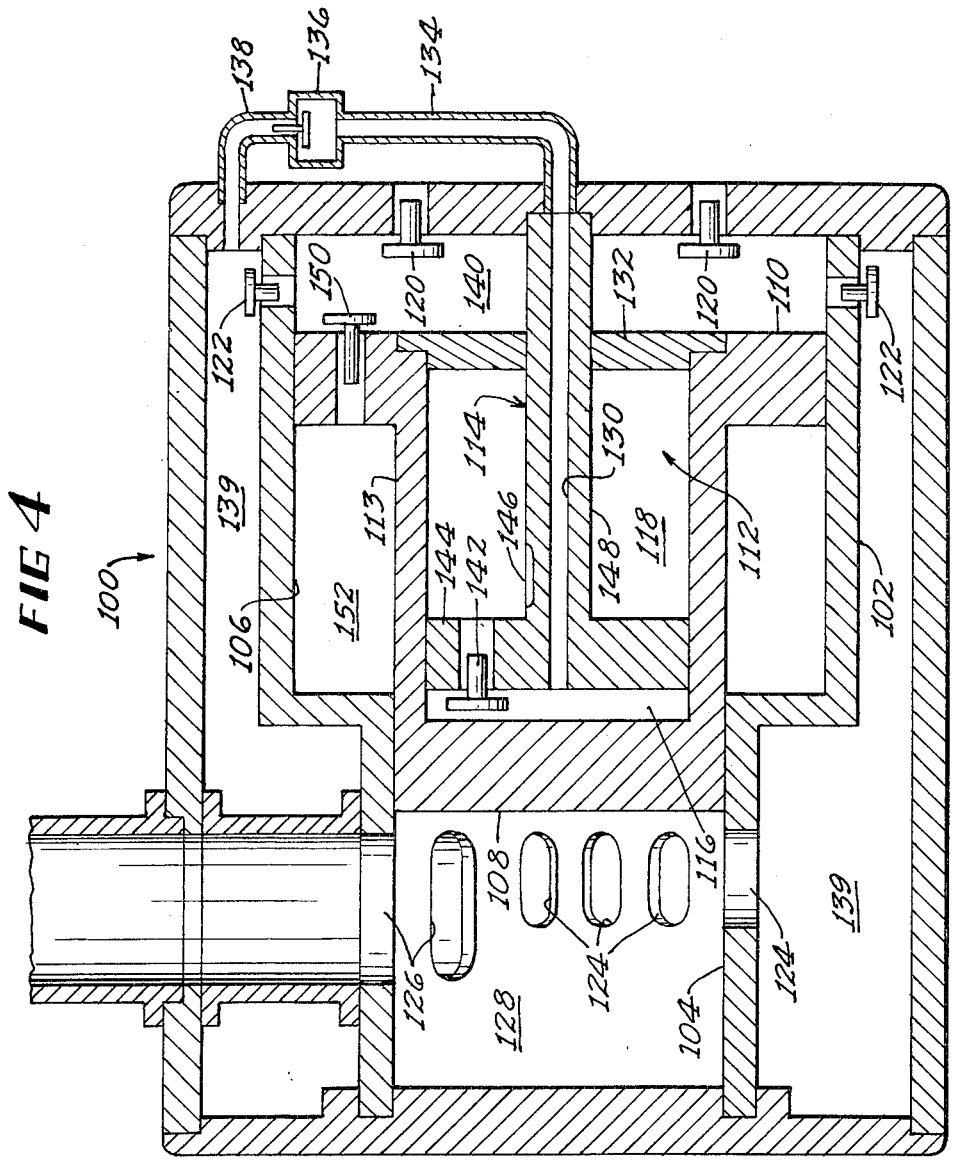

ABSTRACT OF THE DISCLOSURE

The improved free piston engine of this invention is a relatively lightweight and compact engine in which the return energy for the reciprocating, power-compressor piston is supplied by a unique arrangement of a stationary bouncer piston positioned within the reciprocating power-compressor piston. The novel stationary bouncer piston and reciprocating power-compressor piston arrangement permits the clearance volume tof the compressor section of the engine to be designed independently of the power section and permits, for any given power section, a significant reduction in the diameter of the compressor piston, as compared to prior free piston engines having compressor sections of the same volumetric delivery capacity.

This novel stationary bouncer piston and reciprocating power-compressor piston arrangement may be utilized with a free piston engine in which the power-compressor pistons have a uniform diameter, as well as with free piston engines which use the more conventional, so-called "stepped" power-compressor pistons.

CROSS REFERENCES

This is a continuation-in-part of application Ser. No. 657,625 filed Aug. 1, 1967, now abandoned.

BACKGROUND OF THE INVENTION

This invention relates to free piston engines and more particularly, to relatively lightweight, compact free piston engines, such as outward compressing gasifiers and compressors.

It has long been recognized that to sustain satisfactory operation of a free piston engine, sufficient return energy, i.e. work required to return the pistons during the compression stroke in the power section of the free piston engine, must be supplied to the pistons. In prior free piston engines, this return energy has often been supplied by the compressor section, or preferably, by a bouncer section utilized the engine in combination with the compressor section. It is also possible to regulate the return energy by a controlled communication with an independent, external source of gas or air, but this would not be practical in most cases.

While it is theoretically possible to design the compressor section of the engine so that the expansion work of the compressor section will equal the necessary compression work or return energy for the power section compression stroke, the use of the compressor section for this purpose is not always practical. This is because the expansion work of the compressor section is a function of the size of the compressor clearance volume; the expansion work increasing as the size of the compressor clearance volume increases. Moreover, as the size of the compressor clearance volume is increased, the volume of compressor discharge is correspondingly reduced, for a given compressor piston diameter. Therefore, in an engine where the entire return energy was supplied by the compressor section, the diameter of the compressor piston would have to be increased so as to achieve a satisfactory compressor discharge, and this increase in the diameter of the compressor piston would result in the over-all size of the engine being at times too large for successful commercialization.

For this reason, prior free piston engines have utilized bouncer pistons to supply a portion of the necessary return energy. Moreover, the bouncer piston arrangements in the prior free piston engines have generally either been positioned in the power-compressor pistons, positioned between the power piston and the compressor piston, or positioned beyond the outer face of the compressor piston in a separate cylinder. In the past, when the bouncer piston was positioned in the power-compressor pistons, the effective area of the compressor piston was reduced by an amount corresponding to the area of the bouncer piston, and thus, to achieve a desired compressor delivery capacity, the diameter of the compressor piston had to be increased beyond that necessary if the bouncer piston had not been utilized in that fashion. Moreover, while the effective area of the compressor piston is not reduced, the disadvantage of positioning a bouncer piston positioned beyond the outer face of the compressor piston or between the power piston and the compressor piston is that the over-all length of the engine may be increased by as much as fifty percent.

SUMMARY OF THE INVENTION

Briefly, the improved free piston engine of the present invention utilizes a novel bouncer arrangement which does not significantly reduce the compressor piston area of the engine and which may supply substantially all the return energy required to sustain operation of the engine. Thus the clearance volume of the compressor section of this improved free piston engine may be designed and constructed independently of the return energy requirements; and therefore, the compressor section may be designed for maximum compressor discharge while having a compressor piston of minimum diameter.

More specifically, in the embodiment of the invention hereinafter described, the improved free piston engine utilizes a power-compressor piston which has an internal chamber formed therein and which reciprocates within the engine cylinder. A bouncer piston, connected at one end to the engine housing, is positioned within the internal chamber in the reciprocating engine-compressor piston so as to divide the internal chamber into first and second bouncer chambers.

The improved free piston engine of the present invention may have only a single, reciprocating power-compressor piston. While such a free piston engine is, of course, of course, not dynamically balanced, the weight and thus the inertia of the power-compressor piston may be reduced to such an extent that the vibrational forces developed by this dynamic unbalance may be tolerated. Moreover, the improved free piston engine of this invention may also include a pair of axially opposed, reciprocating power-compressor pistons and in such engines, dynamic balance may, of course, be achieved. Likewise, although one of the principal advantages of the present invention is that it permits the design of a practical free piston engine that utilizes uniform diameter power-compressor pistons, thereby simplifying the construction and design of the engine and permitting high cyclic piston speeds while reducing the maximum over-all outer diameter of the engine, the invention may also be used with free piston engines employing conventional so-called "stepped" pistons.

Accordingly, it is an object of the present invention to provide an improved free piston engine in which a novel bouncer piston arrangement permits the clearance volume of the compressor section of the engine to be designed independently of a given power section whereby for a given compressor and power section, the diameter of the compressor piston, and the over-all length of the engine may be minimized.

Another object of the present invention is to provide an improved free piston engine having at least one reciprocating power-compressor piston and a stationary bouncer piston positioned within the reciprocating power-compressor piston whereby first and second bouncer chambers are formed within the reciprocating power-compressor piston, which bouncer chambers may provide substantially all of the necessary return energy for the engine. A related object of the present invention is to provide an improved compact, free piston engine wherein the reciprocating power-compressor piston may have a uniform diameter or, depending on requirements, may be of the more conventional "stepped" type. A still further related object of the present invention is to provide an improved free piston engine in which a pair of axially aligned, power-compressor pistons are utilized whereby the engine may be dynamically balanced.

These and other objects and features of this invention will become apparent from the following description of the preferred embodiments of the invention taken in conjunction with the accompanying drawings.

DESCRIPTION OF THE DRAWINGS

FIGURE 1 is a schematic, vertical cross-sectional view of an improved free piston engine of the present invention wherein a single, uniform diameter reciprocating power-compressor piston is utilized.

FIGURE 2 is a schematic, vertical cross-sectional view of an improved free piston engine of the present invention wherein a pair of axially opposed uniform diameter power-compressor pistons are utilized.

FIGURE 3 is a partially schematic view of an improved free piston engine of the present invention wherein a "stepped" power-compressor piston is utilized.

FIGURE 4 is a partial schematic view of another embodiment of an improved free piston engine of the present invention wherein a "stepped" power-compressor piston is used.

DESCRIPTION OF THE PREFERRED EMBODIMENTS

Referring now ot FIGURE 1, an improved free piston engine 11 of this invention is shown. The engine 11, designed to function as a gasifier, includes a housing 12 in which an engine cylinder 13 is formed. The housing 12 consists of a generally cylindrical side wall 14, an end wall 15 which closes the power section, shown generally at 16, of the engine, and an end wall 17 which closes the compressor section, shown generally at 18, of the engine.

A generally cylindrical wall 19 surrounds and is spaced from the wall 14 of the housing 12 thereby forming an annular chamber 21 between the walls 14 and 19 which is closed at each end by the walls 15 and 17.

A uniform diameter power-compressor piston 22 is positioned in the engine cylinder 13 for reciprocal movement therein. The piston 22 has a relatively thin side wall 23 and end walls 24 and 25, and includes an internal cylindrical chamber 26. Because of its construction the piston 22 may be lightweight and thus has a low inertia and this permits the piston to be reciprocated at relatively high speeds within the cylinder 13 without intolerable external vibrational forces being created.

A combustion chamber 27 is defined in the power section 16 by the side wall 14 and end wall 15 of the housing and the end wall 24 of the piston 22. A plurality of inlet ports, four of which are shown at 28, are formed in the side wall 14 and permit the ingress of air to the chamber 27 from the annular chamber 21. Exhaust ports, two of which are shown at 29, permit the egress of combustion products from the chamber 27. As the piston 22 moves to the left in the cylinder 13, as shown in FIGURE 1, the piston first closes or blocks ports 28 and then the ports 29. Thereafter, the piston 22 continues to move to the left thereby compressing the air or air-fuel mixture in chamber 27. Near the left-most position of piston 22, combustion occurs in the chamber 27 in accordance with the principles of operation of conventional internal combustion engines. In the case of a diesel engine, a conventional fuel injector unit, not shown, may be carried by the end wall 15 and communicate with the chamber 27. Similarly, combustion of the compressed gases in chamber 27 may also be accomplished by the use of a conventional spark plug and accompanying conventional ignition system. It has been found that satisfactory operation of the engine can be obtained where the ratio of the effective stroke of the piston 22 to the total swept stroke of the piston is less than 0.3. The combustion of the gas drives or forces the piston 22 to the right in cylinder 13, as shown in FIGURE 1, and, as hereinafter explained, this movement of the piston compresses the air in the compressor section 18. Moreover, as the piston 22 moves to the right in cylinder 13, the ports 29 are opened or unblocked thereby permitting the combustion products to escape from the chamber 27, and then the ports 28 are opened or unblocked thereby permitting the ingress of air from chamber 21 into chamber 27. The ports 28 and 29 may, for example, be arranged, relative to chamber 27, so that the chamber 27 will be "loop scavenged" or "cross scavenged" during normal operation of the engine 11.

A compressor chamber 31 is defined in the compressor section 18 by the side wall 14 and end wall 17 of the housing 12 and the end wall 25 of the piston 22. Conventional compressor inlet valves, two of which are shown schematically at 32, are positioned in the end wall 17 and permit air to be drawn into the compressor chamber 31 of the compressor section 18 during the movement of the piston 22 to the left, as shown in FIGURE 1. Conventional compressor discharge valves, two of which are shown schematically at 33, are positioned in the side wall 14, adjacent the end wall 17, and permit the air compressed in the compressor chamber 31 by the movement of the piston 22 to the right, as shown in FIGURE 1, to escape from the compressor chamber into the annular chamber 21. As noted above, the engine 11 functions as a gasifier or gas generator in that the compressed air from the compressor chamber 31 is directed through the annular chamber 21 and into the combustion chamber 27 through ports 28.

A bouncer piston assembly 34 includes a stationary bouncer piston 35 positioned within the chamber 26 of the piston 22. The outer peripheral portion 36 of the bouncer piston 35 is substantially equal to the diameter of the chamber 26 so as to minimize the leakage of gas between the wall 23 and the portion 36 of the bouncer piston 35 while the piston 22 reciprocates with respect to the bouncer piston 35. Piston rings may, of course, also be used in the portion 36 for leakage control between wall 23 and piston portion 36.

The bouncer piston 35 is attached to the end wall 17 by a relatively small diameter rod 37 which, as shown, may be integrally formed with the bouncer piston 35, and which projects through a centrally located aperture 38 formed in the end wall 25 of the piston 22. A conventional shaft seal, not shown, may be positioned between the periphery of the aperture 38 and the rod 37. Although the aperture 38 is large enough that the piston 22 may freely reciprocate within the cylinder 12 without interference between the periphery of the aperture 38 and the rod 37, because of the seal, leakage of gas between the rod 37 and the periphery of the hole 38 is minimized. In FIGURE 1, the central longitudinal axis of the rod 37 is coaxial with the central longitudinal axes of the piston 22 and the cylinder 13, while, of course, a similar result may be achieved by using one or more thin rods off the central longitudinal axis to fix piston 35.

The bouncer piston 35 divides internal chamber 26 into inner and outer bouncer chambers 39 and 41 respectively. A conventional check valve, shown schematically at 42, is mounted in the end wall 25 of the piston 22 so as to permit air under pressure to be expelled from the outer bouncer chamber 41 into the compressor chamber 31 when the piston 22 moves to the left, as shown in FIGURE 1. The valve 42 is shown so that the chamber 41 functions as a negative bouncer chamber.

A passage 43 is formed or drilled through the bouncer piston 35 and the rod 37 and this passage interconnects the compressor section 18 and the inner bouncer chamber 39. A conventional check valve, shown schematically at 44, is positioned in the passage 43 and is arranged to permit the flow of air from the compressor chamber 31 to the bouncer chamber 39. Thus, the bouncer chamber 39 functions as a positive bouncer chamber. Of course, it is obvious that the passage 43 could, if desired, connect the bouncer chamber 39 with an independent source of air or gas rather than with the compressor chamber 31.

Moreover, it should be noted that while the bouncer chambers 39 and 41 have been described as bouncer chambers, these chambers together with the bouncer piston 35 could also function as compressors provided conventional compressor inlet and discharge valves were utilized appropriately. One advantage of utilizing the chambers 39 and 41 as compressors is that this would assist in cooling the piston 22.

Moreover, it should also be noted that by using the bouncer piston assembly 35 and the hollow piston 22, all of the area of end wall 25 of the piston 22, except the relatively small area of aperture 38, is utilized to compress air in the compressor chamber 31 of the engine. Furthermore, because most of the return energy for the piston 22 is supplied by the bouncer chamber 39, the compressor clearance volume, that is, the volume of chamber 31 at the right-most position of the piston 22, as shown in FIGURE 1, may be designed independently of engine section 16, and thus the compressor piston may be designed to have a minimum diameter for a given compressor capacity whereby the engine 11 may be quite compact.

While engine 11, as shown, would not be dynamically balanced this unbalance is not thought to present serious vibrational problems in many high speed applications because of the low inertia of piston 22, the only movable part of the engine.

The principles of this invention may also be embodied in an improved free piston engine 45 or gasifier having a pair of axially opposed, power-compressor pistons 46 and 47, such as shown in FIGURE 2. Engine 45 includes a housing 48 having a side wall 49 and end walls 51 and 52 which define an engine cylinder 53. A generally cylindrical wall 54 surrounds and is spaced from the side wall 49 thereby forming an annular chamber 55 therebetween. The ends of the chamber 55 are closed by the end walls 51 and 52. The engine has a centrally located power section 56 and compressor sections 57 and 58.

The uniform diameter pistons 46 and 47 are each substantially identical in construction to the piston 22 of FIGURE 1 and are positioned for reciprocal movement in the engine cylinder 53.

Like piston 22, the pistons 46 and 47 have internal chambers 59 and 61 formed therein. Bouncer piston assemblies 62 and 63 are disposed within the chambers 59 and 61 of the pistons 46 and 47 respectively, and are attached to the end walls 51 and 52, respectively, of the housing 48. The structure and the arrangement of the pistons 46 and 47 and bouncer piston assemblies 62 and 63 are substantially identical to the structure and arrangement of the piston 22 and piston assembly 34 utilized in engine 11 of FIGURE 1. Likewise, the arrangement of the compressor inlet 64 and discharge valves 65 used in the compressor sections 57 and 58 are substantially identical to the corresponding valves in the compressor section 18 of engine 11.

A plurality of inlet ports, five of which are shown at 66, permit communication between the combustion chamber 67, defined by the engine cylinder 53 and the inner faces 68 and 69 of the pistons 46 and 47, respectively, and the annular chamber 55. As in engine 11 the annular chamber 55 or an equivalent conduit serves to direct the compressed air from the compressor sections 57 and 58 to the power section 56. A plurality of exhaust ports, three of which are shown at 71, permit the escape of combustion products from the power section 56 after combustion has occurred in the combustion chamber 67. These exhaust gases may be conveyed away from the engine 45 through a conduit 72 for use, for example, in a conventional gas turbine such as shown at 73.

The operation of the engine 45 is similar to that of conventional free piston engines, in that when the pistons 46 and 47 move together, the air or fuel-air mixture is compressed in the engine section 56, and upon combustion of these gases, pistons are forced apart thereby compressing and ultimately discharging air from the compressor sections 57 and 58. For efficient operation, the height of the exhaust ports 71, i.e., the dimension of the ports 71 parallel to the longitudinal axis of the engine 45, is usually greater than the height of the intake ports 66.

Again, the advantage of the engine 45 is that substantially all the cross-sectional area of the pistons 46 and 47 may be utilized to compress the air in compressor sections 57 and 58, with most of the return energy for the pistons 46 and 47 being supplied by the bouncer chamber formed in the chambers 59 and 69 by the bouncer piston assemblies 62 and 63. As noted above, the use of the bouncer piston assemblies 62 and 63, in cooperation with the pistons 46 and 47 permit the clearance volume in the compressor sections 57 and 58 to be designed independently of the power section 56. Another advantage of the engine of this invention is that uniform diameter power-compressor pistons may be utilized in an otherwise conventional free piston engine.

It should be noted that no synchronizer has been disclosed since the pistons 46 and 47 would be inherently self-synchronizing. However, a suitable synchronizer could be utilized without substantially affecting the operation of the engine 45.

Moreover, since the engine 45 utilizes axially opposed reciprocating pistons, dynamic balance, and thus substantially vibrationless operation, may be achieved.

In engines 11 and 45 described hereinabove, the reciprocating pistons have been of uniform diameter. However, the principles of this invention are also applicable to the more conventional "stepped" piston free piston engines. As in the case of non-stepped pistons the advantage of using the principles of this invention with "stepped" piston engines is that a reduced compressor section diameter and reduced over-all engine size can be realized for any given set of other engine design parameters.

The improved free piston engine or gasifier 74, shown in FIGURE 3, includes an engine housing 75 having a power cylinder 76 and a compressor cylinder 77. A power piston 78 is positioned and adapted to reciprocate within the cylinder 76 and, likewise, a compressor piston 79 is positioned and arranged to reciprocate within the cylinder 77. The piston 79 is similar in construction to piston 22 of engine 11 in that it has an internal chamber 80 formed therein. Pistons 78 and 79 are interconnected by cylindrical side wall 81 so that the pistons reciprocate as a unit.

A bounced piston assembly 82 is positioned within the piston 79 and is adapted to divide chamber 80 of piston 79 into inner and outer bouncer chambers 83 and 84. The bouncer assembly 82 is substantially identical in construction and in arrangement, relative to piston 79 and the housing 75, to that of assembly 34 of FIGURE 1.

The compressor inlet and discharge valves 85 and 86, respectively, and the check valves 87 and 88 which permit communication between the chamber 84 and the compressor section and the chamber 83, respectively, are substantially identical in construction and function to the corresponding valves in engine 11. Likewise, the inlet ports 91 and the exhaust ports 92 which respectively permit ingress and egress of gas to and from the combustion chamber 93 are substantially identical in construction and function to the corresponding ports and chamber in engine 11. In addition, the operation of engine 74 is substantially identical to that of engine 11 and in fact the only significant difference is that engine 11 utilizes a single uniform diameter piston 22; whereas, engine 74 utilizies a "stepped" piston 78 and 79.

The engine 74, with the appropriate porting, could also include a pair of pistons such as engine 45 described hereinabove, if desired.

In engine 74, as shown in FIGURE 3, the novel bouncer arrangement of this invention is arranged in piston portion 79, but it is obvious that the invention could also be utilized by placing the novel bouncer arrangement within piston portion 78. This could be of particular advantage if the cylindrical side wall 81 would be extended into piston end wall 94 since this would result in an engine of substantially shorter length than that of engine 74, shown in FIGURE 3. This is illustrated in FIGURE 4.

The free piston engine or gasifier 100, as shown in FIGURE 4, includes an engine housing 102 having a power cylinder 104 and a compressor cylinder 106. A power piston 108 is positioned and adapted to reciprocate within the cylinder 104, and, likewise, a compressor piston 110 is positioned and arranged to reciprocate within the cylinder 106. The piston 108 is similar in construction to piston 22 of engine 11 shown in FIGURE 1 in that it has an internal chamber 112 formed therein. Pistons 108 and 110 are interconnected by the cylindrical side walls 113 of the power piston 108 so that the pistons reciprocated as a unit.

A bouncer piston assembly 114 is positioned within the piston 108 and is adapted to divide chamber 112 into inner and outer bouncer chambers 116 and 118. The bouncer assembly 114 is substantially identical in construction and arrangement, relative to piston 108 and the housing 102, to that of assembly 34 of FIGURE 1.

The compressor inlet valves 120, the discharge valves 122, and the inlet ports 124 and the exhaust ports 126 which respectively permit ingress and egress of gas to and from the combustion chamber 128 are substantially identical in construction and function to the corresponding valves and ports in engine 11 of FIGURE 1. The valve arrangement to chamber 112 of engine 100 is different, however, from that of engine 11 to illustrate another of the many valving arrangements which may be used with the teaching of the present invention.

In particular, a passage 130 provides communication between inner bouncer chamber 116 and a check valve assembly 136 through tube 134. A further tube 138 then interconnects check valve assembly 136 and an annular chamber 139. With the alternate valving of FIGURE 4 and when piston 108 is at its left-most position within cylinder 104, chamber 116 is charged by the relatively high compressor discharge pressure existing in annular chamber 139, which ducts the compressed air output from the compressor chamber 140 to the chamber 128. By contrast, notice that with the valving as shown in FIGURE 3 the chamber 116 would be charged only with the much lower compressor inlet pressure existing in the compressor chamber 140 at the left-most position of piston 108.

Also, in FIGURE 4 a check valve 142 is positioned within a piston portion 144 of bouncer piston assembly 114. Valve 142 thereby vents chamber 118 into chamber 116 rather than into compressor chamber 140 as would be if done according to the valving of FIGURE 3. Valve 142, as shown, prevents the pressure in chamber 118 from significantly exceeding the pressure in annular chamber 139. Placement of valve 142 within piston 144 also enhances the ability to maintain the proper charge within chamber 116. As a further illustration of a valving arrangement which may be used with the teachings of the present invention, a small valving groove 146 is provided within the rod portion 148 of bouncer piston assembly 114 to further vent chamber 118 into compressor chamber 140, so as to more reliably control the pressure in chamber 112. When piston 108 reaches its left-most position within cylinder 104, the valving slot 146 projects beyond end wall 132 and connects chamber 118 with compressor chamber 140, thus venting chamber 118. A further check valve 150 is provided within piston 110 to vent annular chamber 152 upon the leftward movement of piston 110. Notice that annular chamber 152 may be used as a scavenge or compressor section in a compressor version of the present invention rather than the gasifier version shown.

Further, as previously indicated, passage 130 could, if desired, connect bouncer chamber 116 with an independent source of gas or air rather than a chamber within engine 100. This may be easily accomplished in FIGURE 4 by connecting the independent source of gas or air to tube 138.

CONCLUSION

From the foregoing it will be seen that the improved free piston engines of this invention may be made lighter and more compact than prior engines as a result of the use of the novel bouncer piston arrangement positioned within a reciprocating piston. Moreover, the use of this novel bouncer piston assembly, in cooperation with the reciprocating piston, permits substantially full utilization of the area of the compressor piston for compressing air or gas in the compressor section and permits the clearance volume of the compressor section of the engine to be designed independently of the return energy requirements of the engine since the required return energy heretofore supplied from, in whole or in part, the compressor section may now be substantially supplied by bouncer chambers formed in the reciprocating piston, without increasing the diameter of the compressor section or the overall length of the engine.

As noted above, various modifications can be made in the free piston engines described hereinabove. For example, as noted, the bouncer chambers defined within the reciprocating piston by the bouncer piston assembly may, by the use of proper valving, be made to function as compressors. However, even if these chambers are used as compressors, sufficient return of bounce energy can be available in the engine. While the free piston engines of this invention have been described and illustrated as gasifiers, the invention could be utilized in other types of free piston engines, such as, for example, free piston compressors.

I claim:

1. A free piston engine having power and compressor sections comprising: a housing including an engine cylinder means; piston means positioned in said engine cylinder means for reciprocal movement therein; and relatively fixed means extending into the piston means to define a first and second bouncer chamber means within the piston means.

2. The engine described in claim 1, wherein the piston means includes a piston having inner and outer faces formed thereon and having an internal chamber formed therein; wherein said relatively fixed means comprises a bouncer piston means including a member which projects from an end of said engine cylinder means and which extends through a face of the piston and into said internal chamber, and fixed piston means connected with the member within said internal chamber whereby the fixed piston means divides the internal chamber into inner and outer bouncer chambers.

3. The engine described in claim 2, including a passage connecting the inner bouncer chamber with a source of pressurized fluid and valve means for controlling the pressure in the inner bouncer chamber.

4. The engine of claim 3, wherein the source of pressurized fluid comprises the compressor section of the engine.

5. The engine of claim 3, wherein the source of pressurized fluid comprises a chamber receiving the compressed output of the compressor section of the engine.

6. The engine described in claim 3, further comprising a passage connecting the outer bouncer chamber to a chamber within the engine and valve means for controlling the pressure in the outer bouncer chamber.

7. The engine of claim 3, wherein at least a portion of the passage is formed within the member.

8. The engine of claim 2, wherein the engine cylinder means has a substantially uniform diameter throughout; wherein the piston has substantially uniform diameter; and wherein substantially all of the cross-sectional area of the piston face penetrated by the member is effective piston area.

9. The engine described in claim 1, wherein said piston means includes first and second pistons having inner and outer faces formed thereon, and being positioned within said engine cylinder means so that said inner faces of the piston are adjacent and said outer faces are adjacent the ends of the engine cylinder means; wherein the power section of the engine includes a combustion chamber formed in said engine cylinder means between said inner faces of the pistons; and wherein the compressor section of the engine includes compressor chambers formed in said engine cylinder means between said outer faces the pistons and said ends of said engine cylinder means.

10. The engine described in claim 9, wherein the first and second pistons each have an internal chamber formed therein, and wherein said relatively fixed means comprises first and second bouncer piston means, the first bouncer piston means including a first member projecting from one end of said engine cylinder means and having its inner end extending through the outer face of the first piston and into said internal chamber of the first piston, the second bouncer piston means including a second member projecting from the other end of the engine cylinder means and having its inner end extending through the outer face of the second piston into said internal chamber of the second piston; and fixed piston means connected with the inner ends of each of the first and second members, with the fixed piston means having an outer diameter substantially equal to the diameter of said internal chambers whereby the fixed piston means divides said internal chambers into inner and outer bouncer chambers.

11. The engine described in claim 10, wherein said engine cylinder means has a substantially uniform diameter throughout; wherein the first and second pistons are each combined power-compressor pistons having a substantially uniform diameter; and wherein substantially all of the cross-sectional area of said outer faces of the first and second pistons is used to compress gas in said compressor sections of the engine.

12. In a free piston engine of the type including an engine cylinder having first and second ends, an engine piston arranged for reciprocal movement within the engine cylinder where the engine piston includes a first end which forms a part of a combustion chamber, a second end, and side walls interconnecting the first and second ends to form a hollow within the engine piston, and a bouncer chamber, the improvement comprising:

(a) rigid connection member having first and second ends, the first end being fixedly connected with the engine cylinder and the second end penetrating an end of the engine piston and extending within the hollow of the engine piston, the connection member further having a cross sectional area which is small by comparison to the area of the penetrated end of the piston; and (b) a further piston, having first and second faces, positioned within the hollow of the engine piston and fixedly connected to the second end of the connection member, the further piston defining first and second bouncer chambers within the engine piston, the first bouncer chamber being defined by a portion of the engine piston side walls, the first end of the engine piston, and the first face of the further piston, the second bouncer chamber being defined by a portion of the engine piston side walls, the second end of the engine piston, and the second face of the further piston, relative movement between the reciprocating engine piston and the engine cylinder alternately expanding and contracting the first and second bouncer chambers in opposite phase, an effective cross sectional area of the further piston being large by comparision to the cross sectional area of the rigid connection member.

13. The engine of claim 12, also including:

(aa) passage for providing fluid communication with the first bouncer chamber; and (c) a second engine piston arranged for reciprocal trolling the pressure in the first bouncer chamber.

14. The engine of claim 13, wherein at least a portion of the passage is formed within the connection member.

15. The engine of claim 12, wherein the first end of the engine piston comprises a power piston, wherein the second end of the engine piston comprises a compressor piston, and wherein each engine piston includes at least one further piston.

16. The engine of claim 15, wherein the engine cylinder comprises coaxial power and compressor cylinders, each being of substantially equal uniform diameter throughout, and wherein the engine piston comprises combined coaxial power and compressor pistons being of substantially equal uniform diameter throughout conforming to the engine cylinder diameter.

17. The engine of claim 15, wherein the first bouncer chamber comprises a positive bouncer chamber.

18. The free piston engine of claim 12, further comprising:

(c) A second engine piston arranged for reciprocal movement within the engine cylinder, where the second engine piston includes a first end which forms apart of a combustion chamber, a second end, and side walls interconnecting the first and second ends to form a hollow within the engine piston;

(d) a second rigid connection member having first second ends, the first end being fixedly connected with engine cylinder and the second end penetrating an end of the second piston and extending within the hollow of the second engine piston, the second connection member further having a cross sectional area which is small by comparison to the area of the penetrated end of the second piston; and (e) a second further piston, having first and second faces, positioned within the hollow of the second engine piston and fixedly connected to the second end of the second connection member, the second further piston defining first and second bouncer chambers within the second engine piston, the first bouncer chamber being defined by a portion of the second engine piston sidewalls, the first end of the second engine piston, and the first face of the second further piston, the second bouncer chamber being defined by a portion of the second engine piston sidewalls, the second end of the second engine piston, and the second face of the second further piston, relative movement between the reciprocating second engine piston and the engine cylinder alternately expanding and contracting the first and second bouncer chambers in opposite phase, an effective cross sectional area of the second further piston being large by comparison to the cross sectional area of the second rigid connection member.

19. The engine of claim 18, wherein the first end of the first engine piston and the first end of the second engine piston comprise adjacent power faces, a combustion chamber being formed between the first face of the first engine piston and the first face of the second engine piston, and wherein the first bouncer chamber of the first engine piston and the first bouncer chamber of the second engine piston comprise positive bouncer chambers.

20. The engine of claim 18, wherein the engine cylinder is of substantially uniform diameter throughout and where the first engine piston and the second engine piston are substantially equal uniform diameter throughout conforming to the engine cylinder diameter.

References Cited

UNITED STATES PATENTS

| 1,212,310 | 1/1917 | Avilla. |
| 2,025,177 | 12/1935 | Peslara. |
| 2,079,289 | 5/1937 | Janicke. |
| 2,508,582 | 5/1950 | Prieto. |
| 2,658,486 | 11/1953 | DeWaide. |
| 2,821,968 | 2/1958 | Friedrich. |

FOREIGN PATENTS

| 557,206 | 11/1943 | Great Britain. |
| 889,509 | 2/1962 | Great Britain. |
| 768,155 | 5/1934 | France. |

WENDELL E. BURNS, Primary Examiner

U.S. Cl. X.R.

230—56